US012801835B2

(12) United States Patent
Guo et al.

(10) Patent No.: US 12,801,835 B2
(45) Date of Patent: Nov. 17, 2026

(54) TEXT EDITING METHOD AND APPARATUS

(71) Applicant: VIVO MOBILE COMMUNICATION CO., LTD., Chang'an (CN)

(72) Inventors: Jinliang Guo, Chang'an (CN); Hu Chen, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 239 days.

(21) Appl. No.: 18/605,443

(22) Filed: Mar. 14, 2024

(65) Prior Publication Data

US 2024/0220711 A1 Jul. 4, 2024

Related U.S. Application Data

(63) Continuation of application No. PCT/CN2022/119900, filed on Sep. 20, 2022.

(30) Foreign Application Priority Data

Sep. 24, 2021 (CN) .......................... 202111120003.5

(51) Int. Cl.
*G06F 40/166* (2020.01)
*G06F 3/04842* (2022.01)
(Continued)

(52) U.S. Cl.
CPC ........ *G06F 40/166* (2020.01); *G06F 3/04842* (2013.01); *G06F 3/0488* (2013.01); *G06F 3/04883* (2013.01); *G06F 2203/04808* (2013.01)

(58) Field of Classification Search
CPC .... G06F 40/109; G06F 40/103; G06F 40/166; G06F 3/04883; G06F 3/0481; G06F 3/048; G06F 3/0484; G06F 3/04842; G06F 3/04845; G06F 3/0482; G06F 2203/04808; G06F 3/0488; G06F 3/0233; G06F 9/451
See application file for complete search history.

(56) References Cited

U.S. PATENT DOCUMENTS

2012/0229397 A1 9/2012 Cho et al.
2012/0306772 A1* 12/2012 Tan ........................ G06F 40/166 345/173
(Continued)

FOREIGN PATENT DOCUMENTS

CN 102591851 A 7/2012
CN 103257804 A 8/2013
(Continued)

OTHER PUBLICATIONS

Extended European Search Report for related Application No. 22871965.4; reported on Nov. 27, 2024.
(Continued)

*Primary Examiner* — Nicholas Ulrich

(57) ABSTRACT

The present application discloses a text editing method and apparatus, and pertains to the field of communication technologies. The text editing method includes: in a case that a first text editing function is enabled, receiving a first input performed on to-be-edited text by a user, where the first input is used for text selection; and controlling, in response to the first input, text selected based on the first input to perform a text editing operation associated with a target text editing function.

9 Claims, 6 Drawing Sheets

(51) Int. Cl.
*G06F 3/0488* (2022.01)
*G06F 3/04883* (2022.01)

(56) References Cited

U.S. PATENT DOCUMENTS

| | | | | |
|---|---|---|---|---|
| 2014/0380248 | A1* | 12/2014 | Pangasa | G06F 3/04883 715/863 |
| 2015/0186350 | A1 | 7/2015 | Hicks | |
| 2017/0329428 | A1* | 11/2017 | Seong | G06F 1/1652 |
| 2019/0065441 | A1* | 2/2019 | Kim | G06F 40/109 |
| 2019/0332659 | A1* | 10/2019 | Yang | G06F 3/0481 |
| 2021/0011590 | A1 | 1/2021 | Cui | |

FOREIGN PATENT DOCUMENTS

| | | | |
|---|---|---|---|
| CN | 103744833 | A | 4/2014 |
| CN | 107967093 | A | 4/2018 |
| CN | 109343783 | A | 2/2019 |
| CN | 109815469 | A | 5/2019 |
| CN | 110472199 | A | 11/2019 |
| CN | 112486377 | A | 3/2021 |
| CN | 113807057 | A | 12/2021 |
| EP | 2902897 | A1 | 8/2015 |
| KR | 20120020659 | A | 3/2012 |

OTHER PUBLICATIONS

International Search Report & Written Opinion related to Application No. PCT/CN2022/119900; reported on Oct. 27, 2022.
First Chinese Office Action for related Application No. 202111120003.5; reported on Jun. 14, 2024.
China Academic Journal Electronic Publishing House, "Design of Windows Notepad Based on Java Language."

* cited by examiner

TEXT EDITING METHOD AND APPARATUS

CROSS-REFERENCE TO RELATED APPLICATIONS

This application is a continuation application of PCT Application No. PCT/CN2022/119900 filed on Sep. 20, 2022, which claims priority to Chinese Patent Application No. 202111120003.5 filed in China on Sep. 24, 2021, disclosures of which are incorporated herein by reference in their entireties.

TECHNICAL FIELD

This application pertains to the field of communication technologies, and specifically relates to a text editing method and apparatus.

BACKGROUND

Notes on terminals are commonly used software for text recording, and users are accustomed to using notes on their mobile phones to record daily matters, such as bills, feelings, and other text-related matters.

When editing text in a note, a user needs to select a target function option with a finger in advance before changing text in an editing area if the user wants to change a text size, a color, or a font. However, this changes all text in the editing area. The user has to select a text area that the user wants to change in the editing area in advance, and then select a function option for text setting. This requires the user to frequently switch between selecting a target text editing area and selecting a function option for text setting.

For example, when the user edits a large amount of text in a text area, and wants to change a size, a font, a color, an underline, or the like of text in some paragraph areas, if the user directly selects a text function option, such as font enlargement, all text in the text area is enlarged. The user has to select a target change area in advance, and then select a text function option, so as to change a paragraph font setting of the target area. If there is a large amount of text needing to be changed, the user needs to frequently select a target text area, and then select a function option, affecting text operating experience of using notes by the user. In addition, efficiency of a single-finger operation is low, and other fingers cannot be fully utilized for additional editing operations.

SUMMARY

According to a first aspect, an embodiment of this application provides a text editing method, including:

- in a case that a first text editing function is enabled, receiving a first input performed on to-be-edited text by a user, where the first input is used for text selection; and
- controlling, in response to the first input, text selected based on the first input to perform a text editing operation associated with a target text editing function.

According to a second aspect, an embodiment of this application provides a text editing apparatus, including:

- a first receiving module, configured to receive, in a case that a first text editing function is enabled, a first input performed on to-be-edited text by a user, where the first input is used for text selection; and
- a first response module, configured to control, in response to the first input, text selected based on the first input to perform a text editing operation associated with a target text editing function.

According to a third aspect, an embodiment of this application provides an electronic device. The electronic device includes a processor, a memory, and a program or instructions stored in the memory and executable on the processor. When the program or the instructions are executed by the processor, steps of the method according to the first aspect are implemented.

According to a fourth aspect, an embodiment of this application provides a readable storage medium. The readable storage medium stores a program or instructions. When the program or the instructions are executed by a processor, steps of the method according to the first aspect are implemented.

According to a fifth aspect, an embodiment of this application provides a chip. The chip includes a processor and a communication interface, the communication interface is coupled to the processor, and the processor is configured to run a program or instructions to implement the method according to the first aspect.

According to a sixth aspect, a computer program product is provided. The computer program product is stored in a non-volatile storage medium. The computer program product is executed by at least one processor to implement steps of the method according to the first aspect.

According to a seventh aspect, an electronic device is provided, and configured to perform steps of the method according to the first aspect.

DESCRIPTION OF EMBODIMENTS

Technical solutions in embodiments of this application are clearly described below with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, terms used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" indicates at least one of connected objects, and a character "/" generally indicates an "or" relationship between associated objects.

A text editing method according to an embodiment of this application is described below in detail by using specific embodiments and application scenarios thereof with reference to the accompanying drawings.

Figure 1:
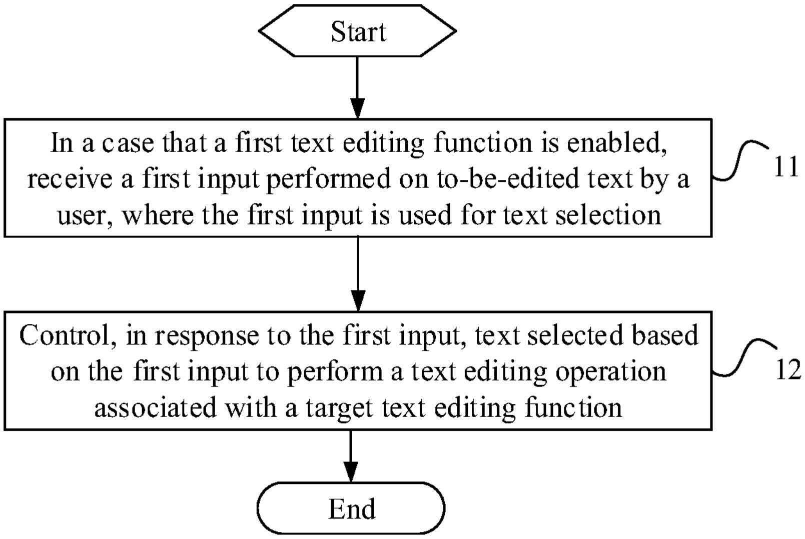
FIG. 1 is a flowchart 1 of a text editing method according to an embodiment of this application.

As shown in FIG. 1, this application provides a text editing method, specifically including the following steps.

Step 11: In a case that a first text editing function is enabled, receive a first input performed on to-be-edited text by a user, where the first input is used for text selection.

In this step, the received first input performed on the to-be-edited text by the user may include N text selection inputs for selecting N non-consecutive parts of text performed on the to-be-edited text by the user, where N is a positive integer.

Step 12: Control, in response to the first input, text selected based on the first input to perform a text editing operation associated with a target text editing function.

In this step, the text editing operation associated with the target text editing function may be performed, in response to the $N^{th}$ first input used for text selection, on the selected $N^{th}$ non-consecutive part of text. Alternatively, the text editing operation associated with the target text editing function is simultaneously performed, in response to the N first inputs used for text selection, on the selected N non-consecutive parts of text.

It should be noted that, the target text editing function is the same as or different from the first text editing function. Specifically, in an input process of text selection, in a case that an input operation performed by the user to update a text editing function is not received, the target text editing function is the same as the first text editing function. In an input process of text selection, in a case that an input operation performed by the user to update a text editing function is received, the target text editing function is different from the first text editing function, and the target text editing function is an updated second text editing function.

In the foregoing embodiment, in the case that the first text editing function is enabled, the first input performed on the to-be-edited text by the user is received, where the first input is used for text selection; and the text editing operation associated with the target text editing function is performed, in response to the first input, on the text selected based on the first input. In this way, in the case that the first text editing function is enabled, the user can select a plurality of non-consecutive text paragraphs, and the text editing operation associated with the target text editing function is automatically performed on the selected text paragraphs, where the target text editing function is the same as or different from the first text editing function, to prevent the user from frequently switching between a text editing area and a function option for text setting, thereby improving text editing efficiency.

Specifically, in an implementation, step 11 includes:

receiving a first touch sub-input performed on a first position in the to-be-edited text by a first finger of the user, and in a case that it is determined that the first finger is stationary, receiving a second touch sub-input performed on a second position in the to-be-edited text by a second finger of the user, where text between the first position and the second position is the selected text.

Figure 2:
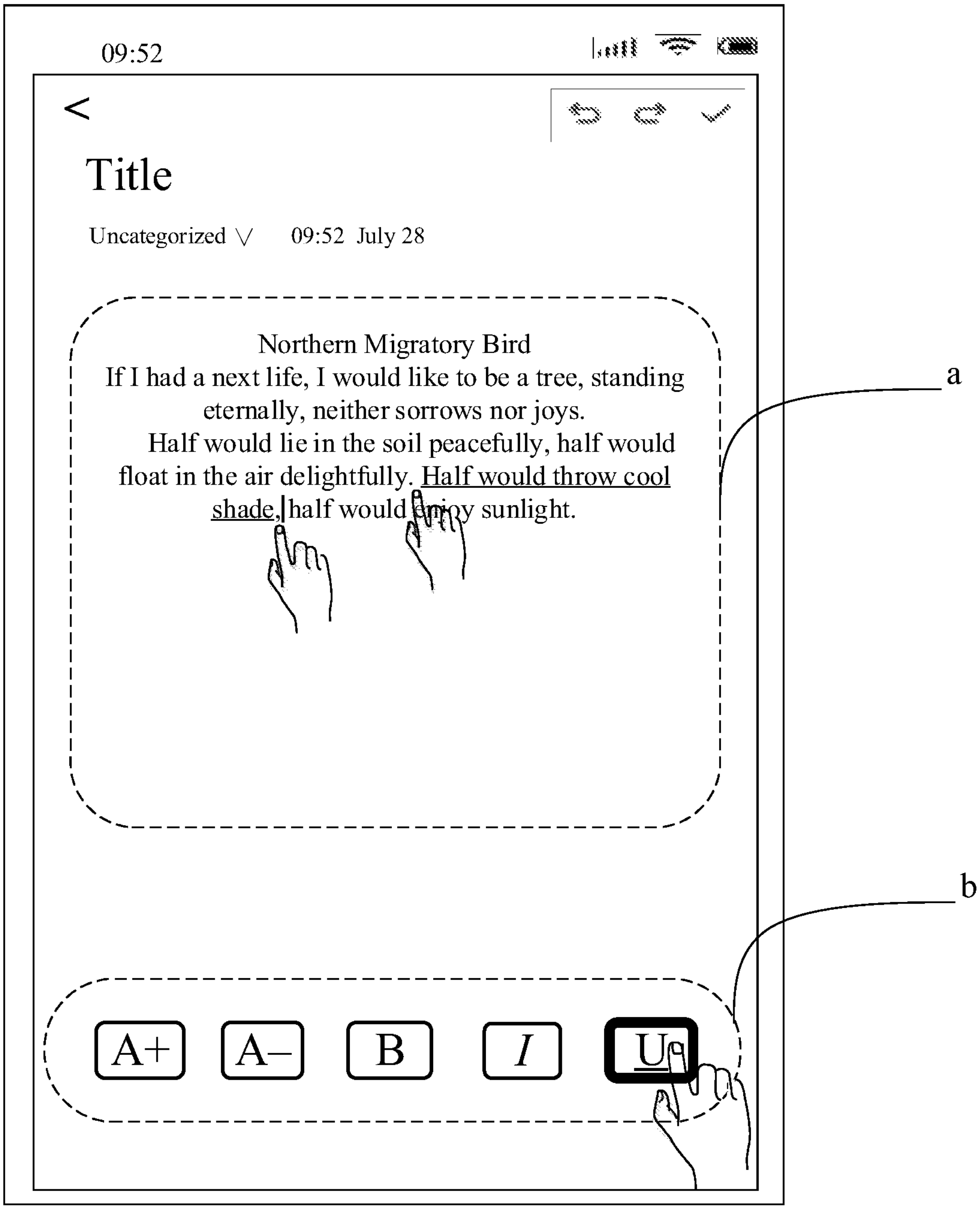
FIG. 2 is a schematic diagram 1 of text editing according to an embodiment of this application.

For example, as shown in FIG. 2, when the user edits text in a text editing area of a note and wants to change a size, a color, a font, an underline, or the like of text in some paragraphs, the user uses a first finger (for example, an index finger shown in FIG. 2) to first select a function option for text editing, for example, select an option to underline text, and places the first finger (for example, the index finger) at a start position (a first position) of a target paragraph; and then starts to use a second finger, and moves and places the second finger at an end position (a second position) of the target paragraph. In this case, a cursor pops up on a screen, a position of the cursor indicates the end position of the target paragraph, and the end position of the target paragraph can be adjusted by moving the cursor left or right. After the end position of the target paragraph is selected, both fingers leave the screen simultaneously. Text between the first finger and the second finger is the selected text and is successfully set with an underline editing effect, and text in other areas is unchanged.

It should be noted that, FIG. 2 shows one finger, but in this method there should actually be two different fingers. For example, the index finger is in the first position, and at the same time, a middle finger is in the second position.

In this method, a multi-finger characteristic of human can be fully utilized, different fingers trigger different instructions and operate different areas, and they are dynamically associated to increase interaction manners of text editing and improve operating experience of the user. In addition, this can reduce repeated operations for the user during text editing, improve operating efficiency of editing text by the user, and reduce time costs of the user.

In another implementation, step 11 includes:

receiving a sliding input for sliding from a third position to a fourth position along a first direction performed by a finger of the user, where text between the third position and the fourth position is the selected text.

For example, as shown in FIG. 2, when the user edits text in a text editing area a of a note and wants to change a size, a color, a font, an underline, or the like of text in some paragraphs, the user uses a first finger (for example, an index finger shown in FIG. 2) to first select a function option for text editing, for example, select an option to underline text, places the index finger at a start position (a third position) of a target paragraph, and then drags and slides the index finger to an end position (a fourth position) of the target paragraph. In a sliding process of the index finger, a cursor pops up on a screen at a position of the index finger, a position of the cursor indicates the end position of the target paragraph, and the end position of the target paragraph can be adjusted by moving the cursor left or right. When the index finger leaves the screen, text between the third position and the fourth position is the selected text and is successfully set with an underline, and text in other areas is unchanged.

In an embodiment, before step 11, enabling the first text editing function is further included, which specifically includes the following steps:

receiving an input operation performed on an option of the first text editing function by the user; and enabling the first text editing function in response to the input operation.

The input operation includes but is not limited to: tapping, pressing, sliding, dragging, double-tapping, or the like.

As shown in FIG. 2, an input operation, performed by the user, of tapping an icon of any first text editing function in a function option area b for text setting is received, and the first text editing function is enabled in response to the input operation.

In an embodiment, in an implementation, before step 12, the method further includes:

receiving a second input; and in response to the second input, disabling the first text editing function and enabling a second text editing function.

Different second inputs correspond to different second text editing functions. Alternatively, different second inputs are associated with different second text editing functions. Specifically, association relationships or correspondences between different second inputs and different second text editing functions may be preset.

For example, when the second input is a double-tap operation, the corresponding second text editing function is a bold font function; when the second input is a tap operation, the corresponding second text editing function is a red font function; and when the second input is an input operation of pressing for first duration, the corresponding second text editing function is an underline function. The foregoing descriptions are merely examples, and do not constitute a limitation.

For example, in a case that step 11 includes receiving a first touch sub-input performed on a first position in the to-be-edited text by a first finger of the user, and in a case that it is determined that the first finger is stationary, receiving a second touch sub-input performed on a second position in the to-be-edited text by a second finger of the user: when the user selects the end position (the second position) of the target paragraph, because a setting option of the first text editing function has been selected, if the user does not want to use the first text editing function for text editing at this time, there is no need to stop an input operation for text selection to re-select a text editing function in the function option area b for text setting, and the user only needs to keep the first finger stationary and perform a second input operation by using the second finger, to switch from the first text editing function to the second text editing function.

For example, in a case that step 11 includes receiving a sliding input for sliding from a third position to a fourth position along a first direction performed by a finger of the user: when the user selects the end position (the fourth position) of the target paragraph by using one finger, because a setting option of the first text editing function has been selected, if the user does not want to use the first text editing function for text editing at this time, there is no need to stop an input operation for text selection to re-select a text editing function in the function option area b for text setting, and the user only needs to keep the finger that performs the input operation for text selection stationary and perform a second input operation (for example, a double-tap operation) by using another finger, to switch from the first text editing function to the second text editing function.

With the use of the foregoing embodiment, the user can conveniently switch editing functions, and reduce repeated single-finger operations during text editing. This can remove unnecessary or redundant single-finger operations, improve operating efficiency of editing text by the user, and reduce time costs of the user.

In an embodiment, in another implementation, before step 12, the method further includes:

receiving a third input;

displaying, in response to the third input, a function selection control, where the function selection control includes a control corresponding to a second text editing function;

receiving a fourth input performed on the control corresponding to the second text editing function; and in response to the fourth input, disabling the first text editing function and enabling the second text editing function.

Figure 3:
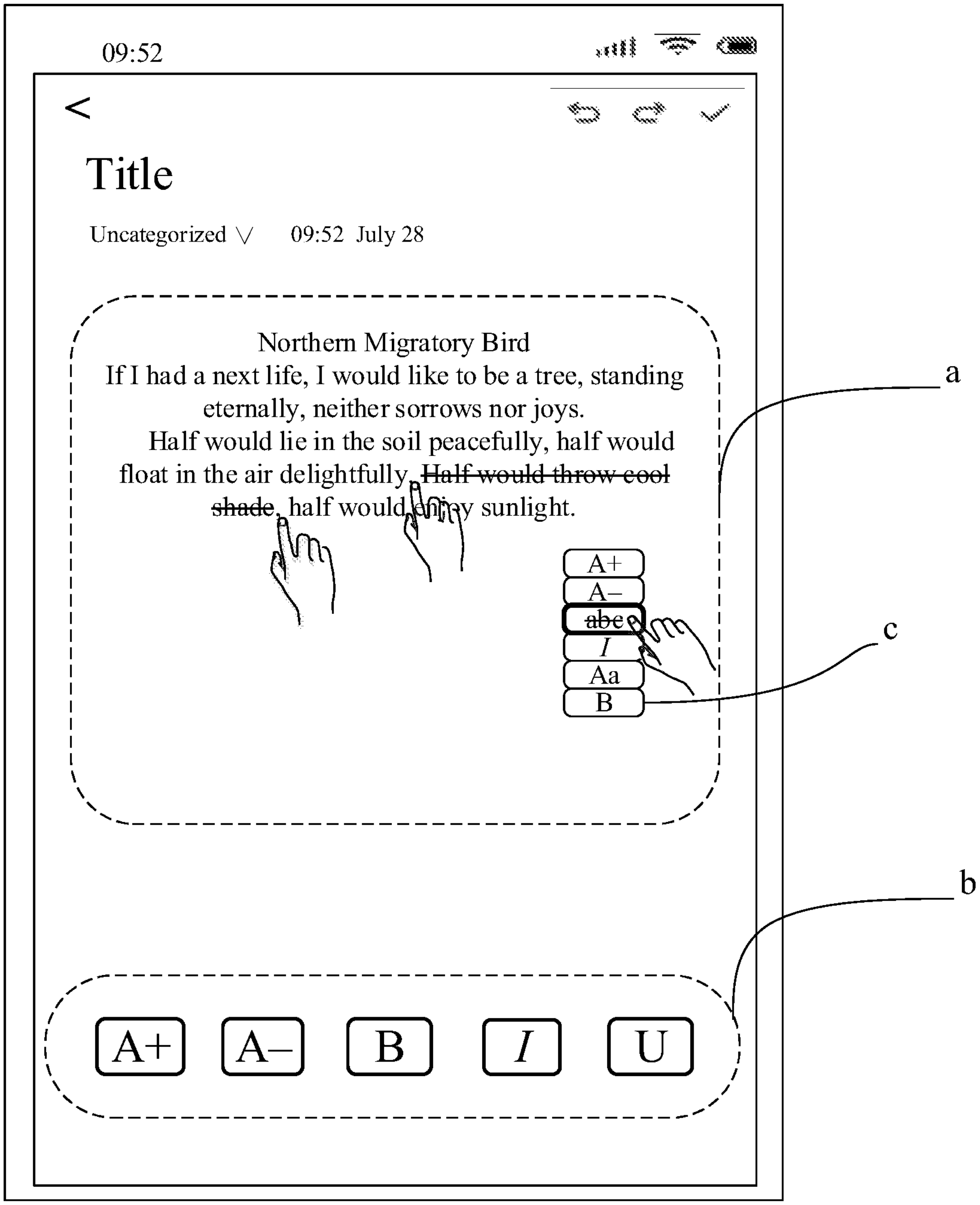
FIG. 3 is a schematic diagram 2 of text editing according to an embodiment of this application.

For example, in a case that step 11 includes receiving a first touch sub-input performed on a first position in the to-be-edited text by a first finger of the user, and in a case that it is determined that the first finger is stationary, receiving a second touch sub-input performed on a second position in the to-be-edited text by a second finger of the user: as shown in FIG. 3, when the user edits text in a text editing area a of a note and wants to change a size, a color, a font, an underline, or the like of text in some paragraphs, the user uses a first finger to first select a target text function option, for example, select an option to add a strikethrough, and places the first finger at a start position of a target paragraph; and then starts to use a second finger, and moves or places the second finger at an end position of the target paragraph. When the user selects the end position (the second position) of the target paragraph, because a setting option of the first text editing function has been selected, if the user does not want to use the first text editing function for text editing at this time, there is no need to stop an input operation for text selection to re-select a text editing function in a function option area b for text setting. The user only needs to double-tap (the third input) a screen by using the second finger, and a recent text function option box c of the user pops up at a current position on the screen, and then the user needs to select a target function option (the second text editing function) by using the second finger. Then a text area between the first finger and the second finger is set according to the selected function option (the second text editing function).

It should be noted that, FIG. 3 shows only one finger, but this is merely an example for description. Actually, when the first finger is stationary at the first position, the finger at the second position and performing the third input is the second finger. Alternatively, when the first finger is stationary at the first position, the finger at the second position may be the second finger, and the finger performing the third input may be a third finger. This is not limited herein.

For example, in a case that step 11 includes receiving a sliding input for sliding from a third position to a fourth position along a first direction performed by a finger of the user: when the user selects an end position (the fourth position) of a target paragraph by using one finger, because a setting option of the first text editing function has been selected, if the user does not want to use the first text editing function for text editing at this time, there is no need to stop an input operation for text selection to re-select a text editing function in a function option area b for text setting. The user only needs to keep the finger that performs the input operation for text selection stationary and perform a third input operation (for example, a double-tap operation) by using another finger, and a recent text function option box c of the user pops up at a current position on a screen, and then the user needs to select a target function option (the second text editing function) by using a second finger. Then an area between the first finger and the second finger is set according to the selected function option (the second text editing function).

Further, in the case that the first text editing function is disabled and the second text editing function is enabled, step 12 includes:

performing, in response to the first input, a text editing operation associated with the second text editing function on the text selected based on the first input.

In this embodiment, in the case that the first text editing function is disabled and the second text editing function is enabled, the target text editing function is the second text editing function that is different from the first text editing function. In this way, the user can conveniently switch text editing functions, to improve text editing efficiency, thereby improving operating experience of using notes by the user.

The text editing method in this application is described below by using a specific example.

Figure 4:
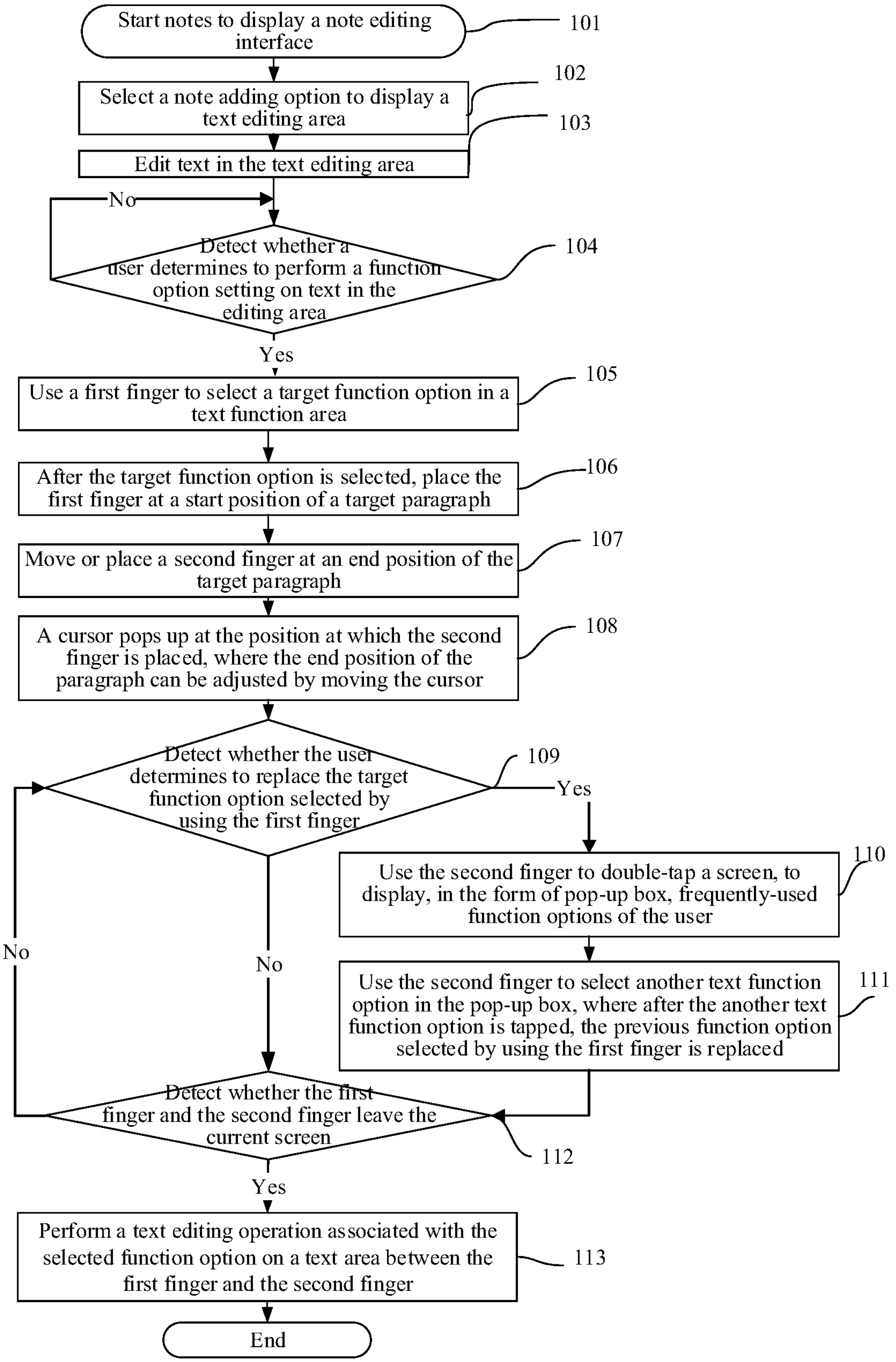
FIG. 4 is a flowchart 2 of a text editing method according to an embodiment of this application.

As shown in FIG. 4, the method mainly includes the following steps.

Step 101: When a user has a requirement for recording matters in text, start notes to display a note editing interface.

Step 102: After the note interface is displayed, select a note adding option to display a text editing area.

Step 103: Edit text in the text editing area, to complete recording of matters according to a personal requirement.

Step 104: After text editing is completed, detect whether the user determines to perform a function option setting on text in the text editing area. If yes, step 105 is performed, or if no, step 104 is performed.

Step 105: Use a first finger to select a target function option (a first text editing function), such as a text size, a font, or a color, in a text function option area.

Step 106: After the target function option is selected, place the first finger at a start position of a target paragraph, where the start position is used as a start point of a text change area.

Step 107: Keep the first finger stationary at the start position of the target paragraph, and move or place a second finger at an end position of the target paragraph.

Step 108: A cursor pops up at the position at which the second finger is placed, where the end position of the paragraph can be adjusted by moving the cursor.

Step 109: Detect whether the user determines to replace the target function option (the first text editing function) selected by using the first finger. If yes, step 110 is performed, or if no, step 112 is performed.

Step 110: Use the second finger to double-tap a screen, to display, in the form of pop-up box, frequently-used function options of the user.

When the user wants to replace the target function option selected by using the first finger, the first finger is still stationary, the user uses the second finger to double-tap the screen, and a floating pop-up box pops up to list frequently-used function options of the user, for example, a text size, a font, a color, and a format.

Step 111: Use the second finger to select another text function option in the pop-up box, where after the another text function option is tapped, the previous function option selected by using the first finger is replaced.

A to-be-set text function option is selected and tapped by using the second finger, and after the tap, a background instruction is used to associatively trigger replacement of the text function option selected by using the first finger.

Step 112: Determine whether the first finger and the second finger leave the current screen. If yes, step 113 is performed, or if no, step 109 is performed.

Step 113: Perform a text editing operation associated with the selected function option on a text area between the first finger and the second finger.

After the two fingers leave the screen, in the text area selected by the first finger and the second finger, the selected function option for text setting is applied and takes effect. For example, if the user selects text enlargement or reduction, or a color setting, text in the area between the first finger and the second finger becomes larger or smaller, or a color changes, and other areas are unchanged.

In the foregoing embodiment, when the user edits text in the text editing area of the notes, a multi-finger characteristic is fully utilized, different fingers trigger different instructions and operate different areas, and they are dynamically associated to increase interaction manners of text editing and improve operating experience of the user. In addition, this can reduce repeated single-finger operations for the user during text editing, and remove unnecessary or redundant single-finger operations, to improve operating efficiency of editing text by the user, and reduce time costs of the user. Therefore, the foregoing solutions can implement a combination of a plurality of instructions of text editing operations, and provide a user with a novel interaction manner of text editing, to greatly improve editing efficiency of note text, reduce repetition of single-finger operations, and improve note operating experience of a user.

It should be noted that, the text editing method provided in the embodiments of this application may be performed by a text editing apparatus, or a control module that is in the text editing apparatus and that is configured to perform the text editing method. In an embodiment of this application, the text editing apparatus provided in the embodiments of this application is described by using an example in which the text editing apparatus performs the text editing method.

Figure 5:
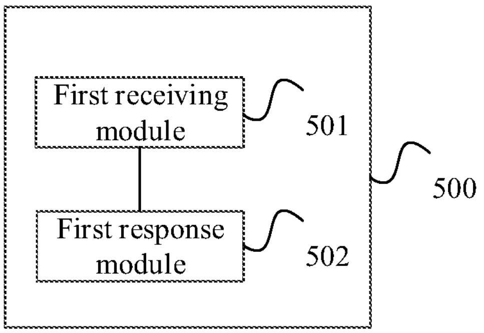
FIG. 5 is a block diagram of a structure of a text editing apparatus according to an embodiment of this application.

As shown in FIG. 5, this application provides a text editing apparatus 500, including:

a first receiving module 501, configured to receive, in a case that a first text editing function is enabled, a first input performed on to-be-edited text by a user, where the first input is used for text selection; and a first response module 502, configured to control, in response to the first input, text selected based on the first input to perform a text editing operation associated with a target text editing function.

Optionally, the first receiving module 501 includes:

a first receiving sub-module, configured to receive a first touch sub-input performed on a first position in the to-be-edited text by a first finger of the user, and in a case that it is determined that the first finger is stationary, receive a second touch sub-input performed on a second position in the to-be-edited text by a second finger of the user, where text between the first position and the second position is the selected text.

Optionally, the apparatus 500 further includes:

a second receiving module, configured to receive a second input; and a second response module, configured to disable the first text editing function and enable a second text editing function in response to the second input.

Optionally, the apparatus 500 further includes:

a third receiving module, configured to receive a third input;

a third response module, configured to display, in response to the third input, a function selection control, where the function selection control includes a control corresponding to a second text editing function;

a fourth receiving module, configured to receive a fourth input performed on the control corresponding to the second text editing function; and a fourth response module, configured to disable the first text editing function and enable the second text editing function in response to the fourth input.

Optionally, in the case that the first text editing function is disabled and the second text editing function is enabled, the first response module 502 includes:

a first response sub-module, configured to perform, in response to the first input, a text editing operation associated with the second text editing function on the text selected based on the first input.

The apparatus 500 provided in this application receives, in the case that the first text editing function is enabled, the first input performed on the to-be-edited text by the user, where the first input is used for text selection; and performs, in response to the first input, the text editing operation associated with the target text editing function on the text selected based on the first input. In this way, in the case that the first text editing function is enabled, the user can select a plurality of non-consecutive text paragraphs, and the text editing operation associated with the target text editing function is automatically performed on the selected text paragraphs, where the target text editing function is the same as or different from the first text editing function, to prevent the user from frequently switching between a text editing area and a function option for text setting, thereby improving text editing efficiency.

The text editing apparatus in the embodiments of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The text editing apparatus in the embodiments of this application may be an apparatus with an operating system. The operating system may be an Android operating system, an iOS operating system, or another possible operating system. This is not specifically limited in the embodiments of this application.

The text editing apparatus provided in the embodiments of this application can implement processes implemented in the method embodiments in FIG. 1 to FIG. 3. To avoid repetition, details are not described herein again.

Figure 6:
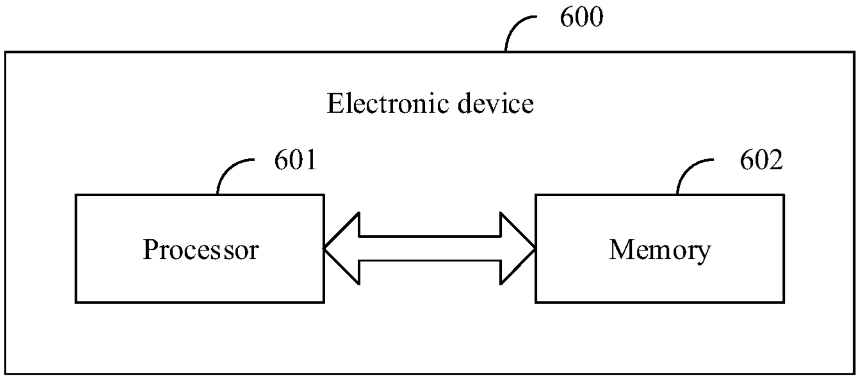
FIG. 6 is a block diagram of a structure of an electronic device according to an embodiment of this application.

Optionally, as shown in FIG. 6, an embodiment of this application further provides an electronic device 600, including a processor 601, a memory 602, and a program or instructions stored in the memory 602 and executable on the processor 601. When the program or the instructions are executed by the processor 601, processes of the foregoing text editing method embodiments are implemented, and a same technical effect can be achieved. To avoid repetition, details are not described herein again.

It should be noted that, the electronic device in this embodiment of this application includes the foregoing mobile electronic device and the foregoing non-mobile electronic device.

Figure 7:
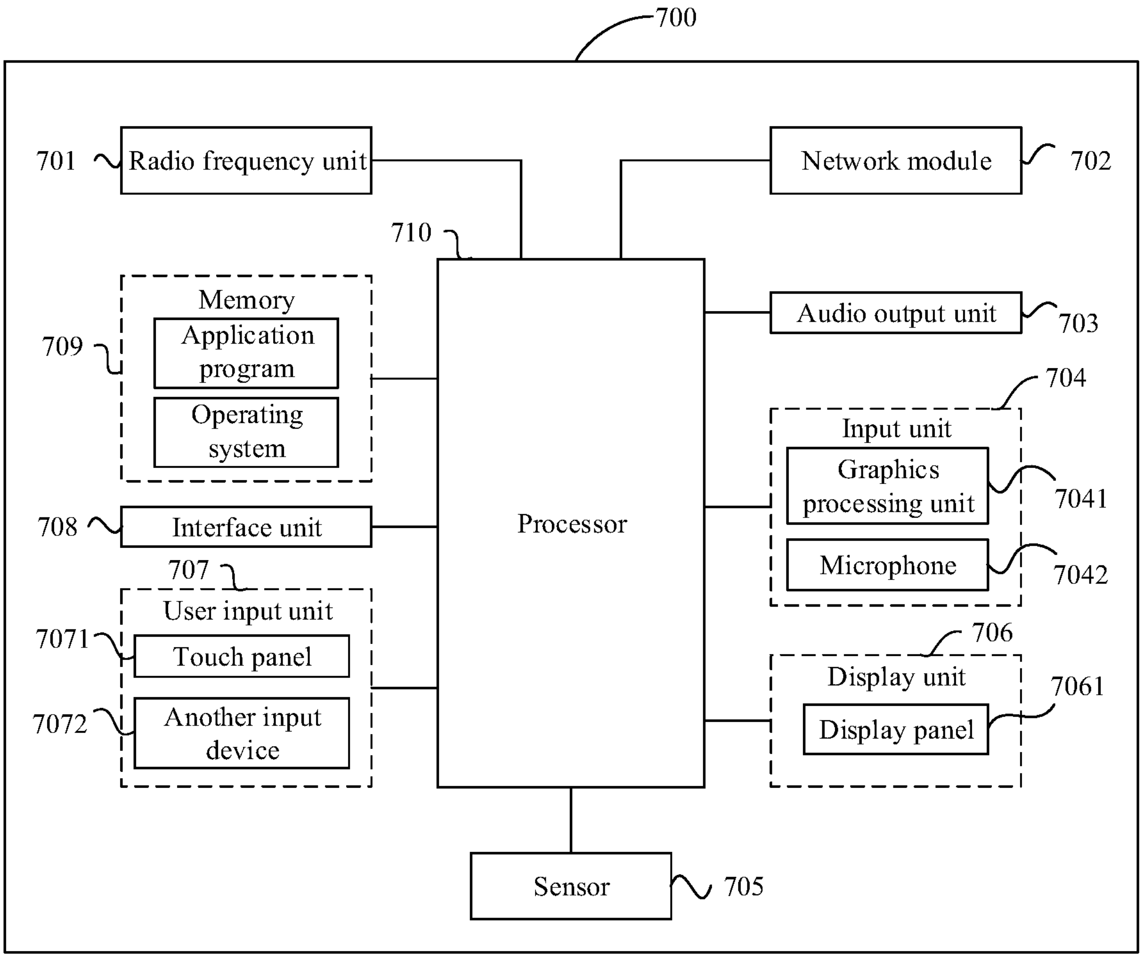
FIG. 7 is a schematic diagram of a hardware structure of an electronic device according to an embodiment of this application.

FIG. 7 is a schematic diagram of a hardware structure of an electronic device according to an embodiment of this application.

The electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the electronic device 700 may further include a power supply (such as a battery) that supplies power to each component. The power supply may be logically connected to the processor 710 by using a power supply management system, to implement functions such as charging and discharging management, and power consumption management by using the power supply management system. The structure of the electronic device shown in FIG. 7 does not constitute a limitation on the electronic device. The electronic device may include components more or fewer than those shown in the figure, or combine some components, or have a different component arrangement. Details are not described herein.

The user input unit 707 is configured to receive, in a case that a first text editing function is enabled, a first input performed on to-be-edited text by a user, where the first input is used for text selection.

The processor 710 is configured to control, in response to the first input, text selected based on the first input to perform a text editing operation associated with a target text editing function.

Optionally, the user input unit 707 is specifically configured to receive a first touch sub-input performed on a first position in the to-be-edited text by a first finger of the user, and in a case that it is determined that the first finger is stationary, receive a second touch sub-input performed on a second position in the to-be-edited text by a second finger of the user, where text between the first position and the second position is used as the selected text.

Optionally, before the processor 710 controls, in response to the first input, the text selected based on the first input to perform the text editing operation associated with the target text editing function, the user input unit 707 is further configured to receive a second input.

The processor 710 is configured to disable the first text editing function and enable a second text editing function in response to the second input.

Optionally, before the processor 710 controls, in response to the first input, the text selected based on the first input to perform the text editing operation associated with the target text editing function, the user input unit 707 is further configured to receive a third input.

The processor 710 is further configured to display, in response to the third input, a function selection control, where the function selection control includes a control corresponding to a second text editing function.

The user input unit 707 is configured to receive a fourth input performed on the control corresponding to the second text editing function.

The processor 710 is further configured to disable the first text editing function and enable the second text editing function in response to the fourth input.

Optionally, in the case that the first text editing function is disabled and the second text editing function is enabled, the processor 710 is specifically configured to perform, in response to the first input, a text editing operation associated with the second text editing function on the text selected based on the first input.

The electronic device 700 provided in this application receives, in the case that the first text editing function is enabled, the first input performed on the to-be-edited text by the user, where the first input is used for text selection; and performs, in response to the first input, the text editing operation associated with the target text editing function on the text selected based on the first input. In this way, in the case that the first text editing function is enabled, the user can select a plurality of non-consecutive text paragraphs, and the text editing operation associated with the target text editing function is automatically performed on the selected text paragraphs, where the target text editing function is the same as or different from the first text editing function, to prevent the user from frequently switching between a text editing area and a function option for text setting, thereby improving text editing efficiency.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. The display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, or a joystick. Details are not described herein. The memory 709 may be configured to store a software program and various data, including but not limited to an application program and an operating system. An application processor and a modem processor may be integrated into the processor 710, the application processor mainly processes an operating system, a user interface, an application program, and the like, and the modem processor mainly processes wireless communication. It can be understood that, alternatively, the modem processor may not be integrated into the processor 710.

An embodiment of this application further provides a readable storage medium. The readable storage medium stores a program or instructions. When the program or the instructions are executed by a processor, processes of the foregoing text editing method embodiments are implemented, and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or instructions to implement processes of the foregoing text editing method embodiments, and a same technical effect can be achieved. To avoid repetition, details are not described herein again.

It should be understood that, the chip mentioned in this embodiment of this application may also be referred to as a system-level chip, a system chip, a chip system, or an on-chip system chip.

An embodiment of this application further provides a computer program product. The computer program product is stored in a readable storage medium, and the computer program product is executed by at least one processor to implement processes of the foregoing text editing method embodiments, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element defined by "includes a . . . " does not preclude the existence of other identical elements in the process, method, article, or apparatus that includes the element. In addition, it should be noted that, the scope of the method and the apparatus in the implementations of this application is not limited to performing functions in an illustrated or discussed sequence, and may further include performing functions in a basically simultaneous manner or in a reverse sequence based on the functions involved. For example, the described method may be performed in an order different from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or a part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the foregoing specific implementations, and the specific implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A text editing method, comprising:

in response to enablement of a first text editing function, receiving a first input performed on to-be-edited text by a user by using a first finger, wherein the first input is used for text selection; and controlling, in response to the first input, text selected based on the first input to perform a text editing operation associated with a target text editing function;

wherein while receiving the first input, the method further comprises:

receiving a second input performed by the user by using a second finger, wherein the second finger is different from the first finger; and in response to the second input, disabling the first text editing function and enabling a second text editing function, wherein different second inputs correspond to different respective second text editing functions;

or, wherein while receiving the first input, the method further comprises:

receiving a third input performed by the user by using a third finger, wherein the third finger is different from the first finger;

displaying, in response to the third input, a function selection control, wherein the function selection control comprises a control corresponding to a second text editing function;

receiving a fourth input performed on the control corresponding to the second text editing function; and in response to the fourth input, disabling the first text editing function and enabling the second text editing function.

2. The method according to claim 1, wherein the receiving a first input performed on to-be-edited text by a user comprises:

receiving a first touch sub-input performed on a first position in the to-be-edited text by the first finger of the user, and in response to a determination that the first finger is stationary, receiving a second touch sub-input performed on a second position in the to-be-edited text by the second finger of the user, wherein text between the first position and the second position is used as the selected text.

3. The method according to claim 1, wherein the controlling, in response to the first input, text selected based on the first input to perform a text editing operation associated with a target text editing function comprises:

performing, in response to the first input, a text editing operation associated with the second text editing function on the text selected based on the first input.

4. An electronic device, comprising a processor, a memory, and a program or instructions stored in the memory and executable on the processor, wherein when the program or the instructions are executed by the processor, following steps are implemented:

in response to enablement of a first text editing function, receiving a first input performed on to-be-edited text by a user by using a first finger, wherein the first input is used for text selection; and controlling, in response to the first input, text selected based on the first input to perform a text editing operation associated with a target text editing function;

wherein while receiving the first input, following steps are further implemented:

receiving a second input performed by the user by using a second finger, wherein the second finger is different from the first finger; and in response to the second input, disabling the first text editing function and enabling a second text editing function, wherein different second inputs correspond to different respective second text editing functions;

or, wherein while receiving the first input, following steps are further implemented:

receiving a third input performed by the user by using a third finger, wherein the third finger is different from the first finger;

displaying, in response to the third input, a function selection control, wherein the function selection control comprises a control corresponding to a second text editing function;

receiving a fourth input performed on the control corresponding to the second text editing function; and in response to the fourth input, disabling the first text editing function and enabling the second text editing function.

5. The electronic device according to claim 4, wherein the receiving a first input performed on to-be-edited text by a user comprises:

receiving a first touch sub-input performed on a first position in the to-be-edited text by the first finger of the user, and in response to a determination that the first finger is stationary, receiving a second touch sub-input performed on a second position in the to-be-edited text by the second finger of the user, wherein text between the first position and the second position is used as the selected text.

6. The electronic device according to claim 4, wherein the controlling, in response to the first input, text selected based on the first input to perform a text editing operation associated with a target text editing function comprises:

performing, in response to the first input, a text editing operation associated with the second text editing function on the text selected based on the first input.

7. A non-transitory readable storage medium storing a program or instructions, wherein when the program or the instructions are executed by a processor, following steps are implemented:

in response to enablement of a first text editing function, receiving a first input performed on to-be-edited text by a user by using a first finger, wherein the first input is used for text selection; and controlling, in response to the first input, text selected based on the first input to perform a text editing operation associated with a target text editing function;

wherein while receiving the first input, following steps are further implemented:

receiving a second input performed by the user by using g a second finger, wherein the second finger is different from the first finger; and in response to the second input, disabling the first text editing function and enabling a second text editing function, wherein different second inputs correspond to different respective second text editing functions;

or, wherein while receiving the first input, following steps are further implemented:

receiving a third input performed by the user by using a third finger, wherein the third finger is different from the first finger;

displaying, in response to the third input, a function selection control, wherein the function selection control comprises a control corresponding to a second text editing function;

receiving a fourth input performed on the control corresponding to the second text editing function; and in response to the fourth input, disabling the first text editing function and enabling the second text editing function.

8. The non-transitory readable storage medium according to claim 7, wherein the receiving a first input performed on to-be-edited text by a user comprises:

receiving a first touch sub-input performed on a first position in the to-be-edited text by the first finger of the user, and in response to a determination that the first finger is stationary, receiving a second touch sub-input performed on a second position in the to-be-edited text by the second finger of the user, wherein text between the first position and the second position is used as the selected text.

9. The non-transitory readable storage medium according to claim 7, wherein the controlling, in response to the first input, text selected based on the first input to perform a text editing operation associated with a target text editing function comprises:

performing, in response to the first input, a text editing operation associated with the second text editing function on the text selected based on the first input.

* * * * *